(12) United States Patent
Nitta et al.

(10) Patent No.: US 6,999,725 B2
(45) Date of Patent: Feb. 14, 2006

(54) CONTROLLING OPERATION OF MOBILE BASE STATION SO AS TO AVOID RADIO INTERFERENCE

(75) Inventors: Kazumasa Nitta, Yokosuka (JP); Masaaki Yoshimi, Fujisawa (JP); Hisashi Matsuoka, Yokohama (JP); Takashi Ono, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 573 days.

(21) Appl. No.: 10/183,453

(22) Filed: Jun. 28, 2002

(65) Prior Publication Data
US 2003/0003874 A1   Jan. 2, 2003

(30) Foreign Application Priority Data
Jun. 29, 2001   (JP)   ............................ 2001-199089

(51) Int. Cl.
   *H04B 1/10*   (2006.01)
(52) U.S. Cl. .................. 455/63.1; 455/11.1; 455/67.11
(58) Field of Classification Search .............. 455/11.1, 455/63.1, 63.3, 7, 9, 67.11, 67.13; 370/315, 370/320, 335, 342
See application file for complete search history.

(56) References Cited

U.S. PATENT DOCUMENTS

| | | | |
|---|---|---|---|
| 6,047,160 A * | 4/2000 | Priest et al. ............... | 455/11.1 |
| 2003/0003874 A1 * | 1/2003 | Nitta et al. ............... | 455/67.1 |

FOREIGN PATENT DOCUMENTS

| | | |
|---|---|---|
| CN | 1335024 | 2/2002 |
| WO | WO 00/36858 | 6/2000 |

* cited by examiner

*Primary Examiner*—Lee Nguyen
(74) *Attorney, Agent, or Firm*—Oblon, Spivak, McClelland, Maier & Neustadt, P.C.

(57) ABSTRACT

A method of controlling an operation of a mobile base station that is linked to a mobile communication system via a wireless relay channel includes an information acquiring step of acquiring estimation-purpose base information for estimating a condition of radio interference between the mobile base station and one or more other base stations, the acquisition of the estimation-purpose base information being made by the mobile base station and involving measurement of a physical property responsive to a current position of the mobile base station, an estimation step of estimating the condition of radio interference based on the acquired estimation-purpose base information, and a control step of controlling an operation of the mobile base station based on the estimated condition of radio interference.

11 Claims, 6 Drawing Sheets

CONTROLLING OPERATION OF MOBILE BASE STATION SO AS TO AVOID RADIO INTERFERENCE

BACKGROUND OF THE INVENTION

1. Field of the Invention

The present invention generally relates to a method of operating and controlling a mobile base station in mobile communications systems, and particularly relates to a method of operating and controlling a mobile base station by controlling the operation of a mobile base station connected to a mobile communications system via a wireless relay channel by taking into account radio interference with another base station that is fixedly installed.

Further, the present invention relates to a mobile base station to which such a method of operating and controlling a mobile base station is applied.

2. Description of the Related Art

When a base station is to be newly installed in the mobile communications system, simulation or analysis is conducted regarding radio interference between the newly installed base station and existing base stations in the surrounding area. Based on the findings, operation conditions are determined, including radio communication characteristics such as a frequency to be used, codes to be used, a transmission power, a directionality of radio transmission, and so on, in order to use the new base station in the mobile communications system. The newly installed base station is then operated according to the operation conditions inclusive of the radio communication characteristics that were determined for the mobile communications system.

There are cases in which a mobile base station linked to the mobile communications system via the wireless relay function is to be temporarily installed in an area where a temporal surge of traffic is expected. In such a case, it is not desirable to conduct simulation or analysis regarding radio interference with existing base stations for the purpose of determining the operation conditions each time such a temporary base station is to be installed. If such simulation or analysis must be conducted prior to every such installment, the installment of mobile base stations cannot be conducted with sufficient flexibility and promptness.

A base station that is installed in a vehicle such as a land vehicle, a ship, and an aircraft (such a base station is also referred to as a mobile base station) may be located outside the communication area covered by the fixed base stations of the mobile communications system. For example, a mobile base station installed in a ship on the sea may be operated without taking into account radio interference with the base stations that are fixedly installed on the land. If the vehicle enters the communication area covered by the fixed base stations, such as when the ship makes a stop at a bay, it may be possible to have radio interference between the mobile base station of the vehicle and the fixed base stations.

In order to avoid such radio interference, operation conditions of the mobile base station may be determined in advance by the method as previously described. Even when the mobile base station is operated based on the operation conditions determined in such a manner, however, the movement of the mobile base station to a new point different from the expected point may still create radio interference between the mobile base station and the fixed base stations.

Further, after the operation conditions of the mobile base station are determined with respect to a given point, the operative conditions of the fixed base stations may change in the mobile communications system, or the arrangement of the fixed base stations may change. In such a base, the mobile base station operated according to the predetermined operation conditions may create interference with the fixed base stations.

Accordingly, there is a need for a method of controlling the operation of a mobile base station that makes it possible to properly control the operation of the mobile base station regardless of the position thereof in the mobile communication system.

Further, there is a need for a mobile base station to which such a method of controlling the operation of a mobile base station is applied.

SUMMARY OF THE INVENTION

It is a general object of the present invention to provide a method of controlling the operation of a mobile base station that substantially obviates one or more of the problems caused by the limitations and disadvantages of the related art.

It is another and more specific object of the present invention to provide a method of controlling the operation of a mobile base station that achieves proper control of the mobile base station regardless of the position thereof in the mobile communication system.

Further, it is still another object of the present invention to provide a mobile base station to which such a method of controlling the operation of a mobile base station is applied.

In order to achieve the above objects according to the present invention, a method of controlling an operation of a mobile base station that is linked to a mobile communication system via a wireless relay channel includes an information acquiring step of acquiring estimation-purpose base information for estimating a condition of radio interference between the mobile base station and one or more other base stations, the acquisition of the estimation-purpose base information being made by the mobile base station and involving measurement of a physical property responsive to a current position of the mobile base station, an estimation step of estimating the condition of radio interference based on the acquired estimation-purpose base information, and a control step of controlling an operation of the mobile base station based on the estimated condition of radio interference.

The method of controlling the operation of a mobile base station acquires the estimation-purpose base information at the current position of the mobile base station, and estimates the condition of radio interference between the mobile base station and other base stations based on the acquired estimation-purpose base information. Based on the estimated condition of radio interference, the operation of the mobile base station is controlled.

Accordingly, the condition of radio interference between the mobile base station and other base stations can be estimated in real-time wile following changes of the position of the mobile base station as it moves, and the operation of the mobile base station is controlled based on the real-time estimates of radio interference.

A wireless relay channel that links the mobile base station to the mobile communication system can be any relay channel at least partially including a wireless channel. Such wireless relay channel may include a satellite relay channel, a terrestrial microwave relay channel, a channel of another mobile communication system, etc.

According to another aspect of the present invention that places an emphasis on easier estimation of radio interference, the method as described above is such that the information acquiring step measures the position of the mobile base station as the estimation-purpose base information, and the estimation step estimates the condition of radio interference by assessing a relative positional relationship between the measured position of the mobile base station and positions of the one or more other mobile stations.

The relative positional relationship (e.g., defined in terms of distances and directions) between the measured position of the mobile base station and the positions of other base stations provides an estimate of the condition of radio interference by using a set of predetermined assumptions regarding radio characteristics.

According to another aspect of the present invention that places an emphasis on reliable estimation of radio interference, the method as described above is such that the information acquiring step measures one or more radio waves received by the mobile base station from one or more neighboring base stations as the estimation-purpose base information, and the estimation step estimates the condition of radio interference by comparing the measured radio waves with a radio wave to be used by the mobile base station.

In the method of controlling the operation of the mobile base station described above, the condition of radio interference is estimated by comparing the actually measured radio waves with the radio wave to be used by the mobile base station, so that a reliable estimate can be obtained with regard to the condition of radio interference between the mobile base station and the other base stations.

A specific characteristic of the radio waves that is to be compared is not limited to any particular example, and can be any characteristic as long as it relates to radio interference. For example, a characteristic to be compared may be a radio frequency, or may be base-station-specific codes if the mobile communication system is based on the CDMA method.

According to another aspect of the present invention, the method as described above is such that the control step makes the mobile base station stay in a standby state in response to the estimated condition of radio interference that indicates presence of radio interference.

According to another aspect of the present invention, the method as described above further includes a switching step of switching operation conditions of the mobile base station, wherein the control step controls the operation of the mobile base station according to an operation condition obtained by the switching step if the switching step obtains the operation condition that insures absence of radio interference.

The operation conditions described above are not limited to particular examples, and can be any conditions as long as they relate to the operation of the mobile base station, exemplary conditions including radio communication characteristics such as a frequency to be used, a code to be used, a transmission power, and a directionality of radio transmission.

According to another aspect of the present invention that places an emphasis on self-reliant operation control, the method as described above is such that the estimation step is performed by the mobile base station.

According to another aspect of the present invention that places an emphasis on reducing the load on the mobile base station, the method as described above is such that the estimation step is performed by a facility of the mobile communication system based on the estimation-purpose base information supplied from the mobile base station to the facility via a wireless relay channel.

Further, the method as described above is such that the control step makes the facility generate operation control information based on the estimated condition of radio interference estimated by the facility, and controls the operation of the mobile base station based on the operation control information transferred from the facility to the mobile base station via the wireless relay channel.

The operation control information described above may include operation conditions indicative of what conditions are used for operation such as conditions regarding radio communication characteristics (e.g., a frequency to be used, a code to be used, a transmission power, and a directionality of radio transmission), and may also include information indicative of whether the mobile base station is in operation or not (i.e., in a standby state).

According to another aspect of the present invention, a mobile base station to be linked to a mobile communication system via a wireless relay channel includes an information acquiring unit which acquires estimation-purpose base information for estimating a condition of radio interference between the mobile base station and one or more other base stations, the acquisition of the estimation-purpose base information involving measurement of a physical property responsive to a current position of the mobile base station, an estimation unit which estimates the condition of radio interference based on the acquired estimation-purpose base information, and a control unit which controls an operation of the mobile base station based on the estimated condition of radio interference.

According to another aspect of the present invention, a mobile base station to be linked to a mobile communication system via a wireless relay channel includes an information acquiring unit which acquires estimation-purpose base information for estimating a condition of radio interference between the mobile base station and one or more other base stations, the acquisition of the estimation-purpose base information involving measurement of a physical property responsive to a current position of the mobile base station, a transferring unit which transfers the estimation-purpose base information to a facility of the mobile communication system via a wireless relay channel, and a control unit which controls an operation of the mobile base station according to operation control information received from the facility via the wireless relay channel, the operation control information being produced by the facility based on the estimated condition of radio interference estimated by the facility.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
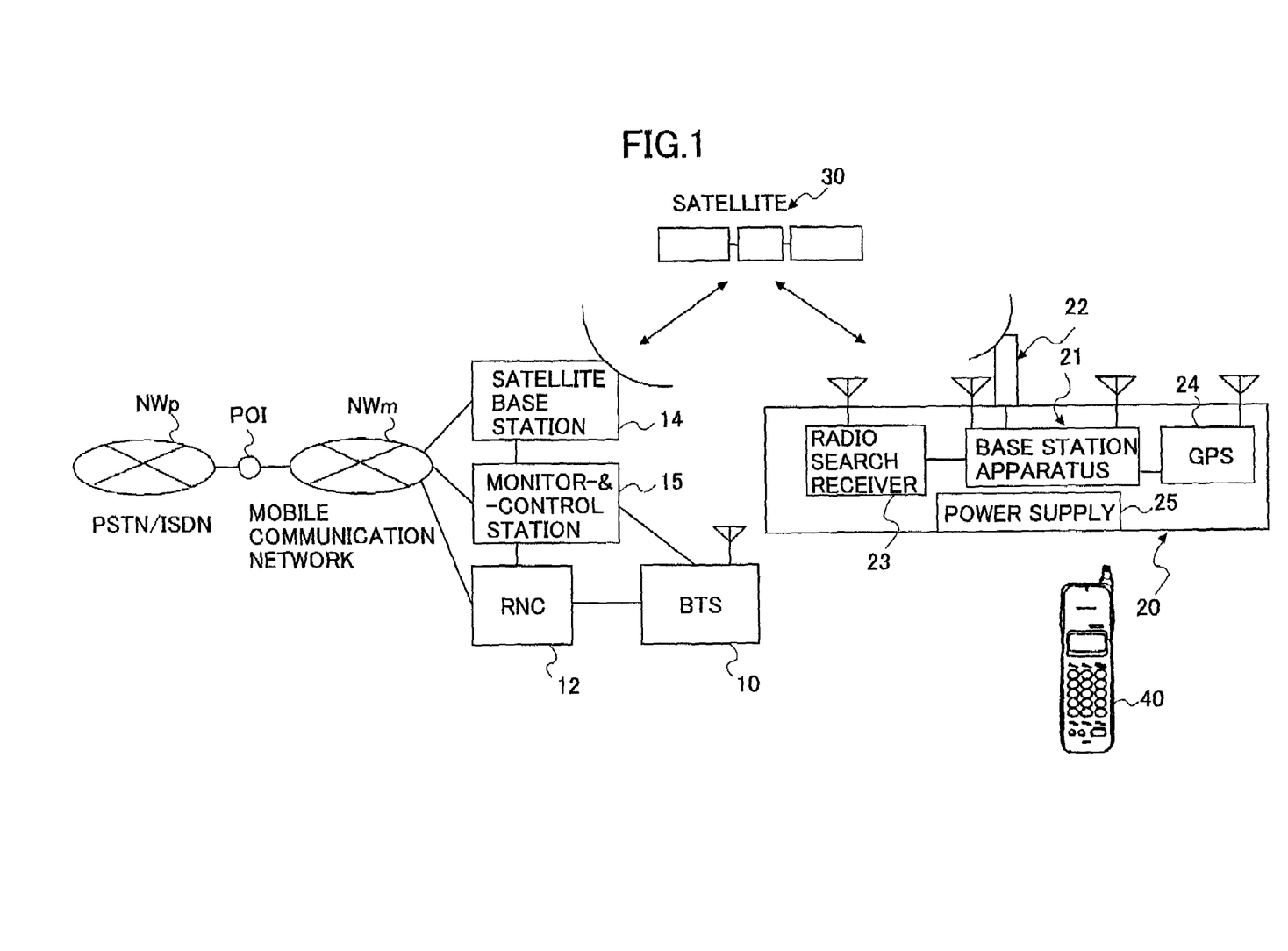
FIG. 1 is an illustrative drawing showing the configuration of a mobile communication system that includes a mobile base station to which a method of operation control according to the present invention is applied.

FIG. 1 is an illustrative drawing showing the configuration of a mobile communication system that includes a mobile base station to which a method of operation control according to the present invention is applied. Here, the mobile communication system may be based on a cellular scheme or a CDMA scheme.

In FIG. 1, the mobile communication system includes a base station (DTS) 10 fixedly installed on the ground, a control station (RNC) 12, a satellite base station 14, and a monitor-&-control station 15. The base station 10 is connected to the control station 12. The base station 10, the control station 12, and the satellite base station 14 are connected to the monitor-&-control station 15. The control station 12, the satellite base station 14, and the monitor-&-control station 15 are connected to a mobile communication network NWm. The mobile communication network NWm is connected to a public switched telephone network (PSTN/ISDN) NWp via an interface (POI: point of interface). The mobile communication system may further include a mobile base station 20.

The control station 12 attends to control such as the switch control of the base station 10. The satellite base station 14 communicates with the mobile base station 20 by use of a satellite relay channel via a satellite 30. In this manner, the mobile base station 20 is linked to the mobile communication system via the satellite relay channel. The monitor-&-control station 15 monitors the operations of the base station 10, the control station 12, and the satellite base station 14. Further, the monitor-&-control station 15 may monitor the operation of the mobile base station 20 based on the information supplied from the satellite base station 14 that communicates with the mobile base station 20 via the satellite relay channel.

A mobile station 40 may communicate with the base station 10 through a predetermined method (e.g., the CDMA method), and, in such a case, may communicate with other communication equipment connected to the mobile communication network NWm by communicating through the base station 10 and the control station 12. The mobile station 40 may communicate with the mobile base station 20 through a predetermined method, and, in such a case, may communicate with other communication equipment connected to the mobile communication network NWm by communicating through the mobile base station 20, the satellite relay channel, and the satellite base station 14.

The mobile base station 20 includes a base station apparatus 21, a relay channel apparatus 22, a radio search receiver 23, a GPS (global positioning system) apparatus 24, and a power supply 25. The mobile base station 20 is installed in a vehicle such as a land vehicle, ship, and aircraft.

The base station apparatus 21 communicates with the mobile station 40 (e.g., a mobile telephone) according to a predetermined method (e.g., the CDMA method) defined in the mobile communication system. The relay channel apparatus 22 is provided with a relay channel antenna, and communicates with the satellite base station 14 through the satellite relay channel that is established with the satellite base station 14 via the satellite 30. The relay channel apparatus 22 is connected to the base station apparatus 21, so that the mobile station 40 having radio communication with the base station apparatus 21 can communicate with the satellite base station 14 via the satellite relay channel.

The radio search receiver 23 receives radio waves transmitted from base stations (e.g., the base station 10) in the surrounding areas. The received signals of the received radio waves are supplied from the radio search receiver 23 to the base station apparatus 21. The GPS apparatus 24 measures the position of the mobile base station 20 (e.g., in terms of latitude and longitude). The position information obtained by the GPS apparatus 24 is supplied to the base station apparatus 21. The power supply 25 supplies electric power to the apparatuses of the mobile base station 20.

The mobile base station 20 of the mobile communication system as described above attends to the control of the mobile base station according a procedure shown in FIG. 2 through FIG. 5.

Figure 2:
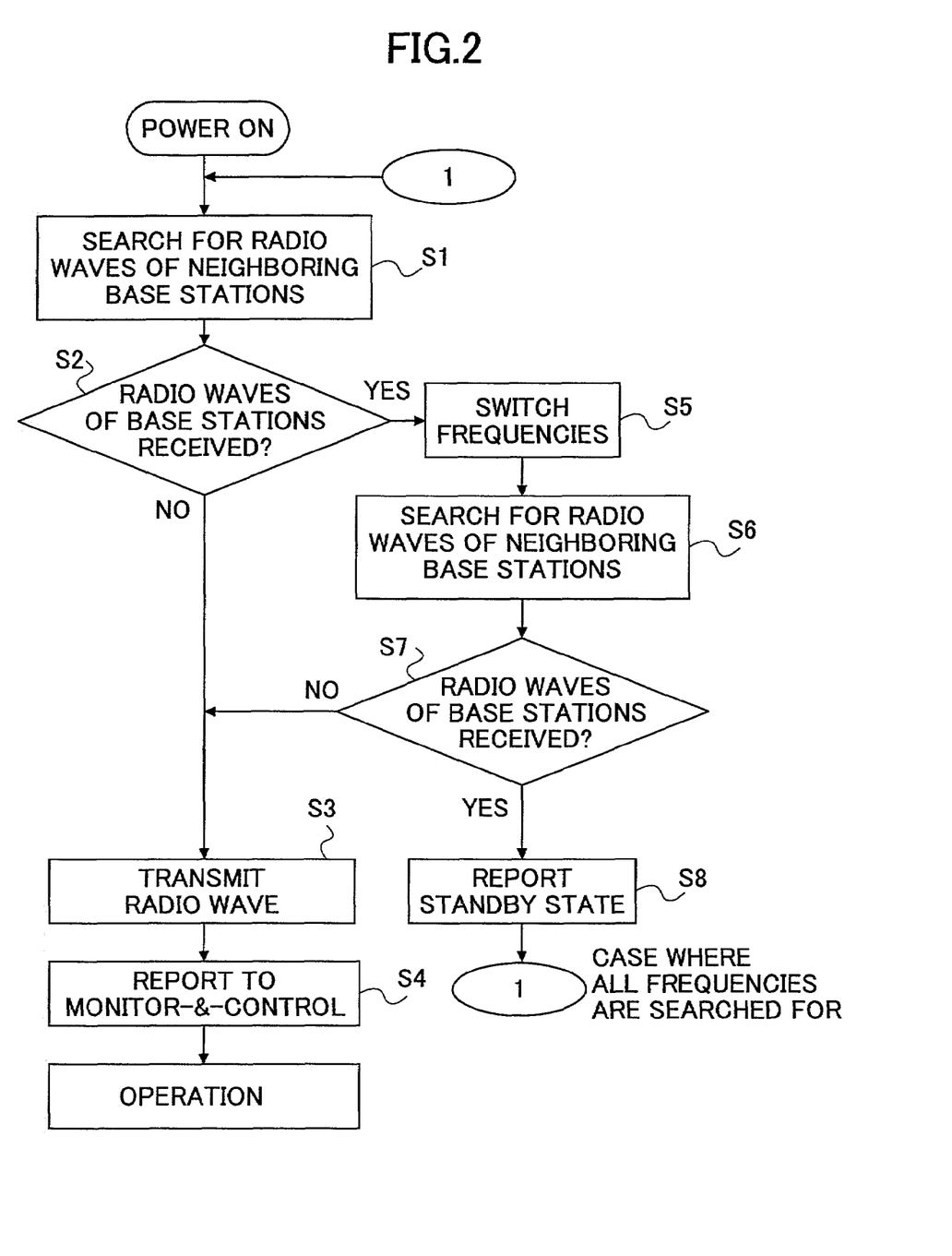
FIG. 2 is a flowchart showing a procedure by which the mobile base station is controlled as to the operation thereof.

In FIG. 2, when power is switched on while the mobile base station 20 is moving or is at a halt, the radio search receiver 23 searches for radio waves received from neighboring base stations (step S1). Based on the search findings, the base station apparatus 21 checks whether the radio waves found in this manner include the same frequency that the base station apparatus 21 is supposed to use for its own communication (step S2). If the radio waves found in the above-specified manner do not include the same frequency that the base station apparatus 21 is supposed to use for its own communication (NO at step S2), it is ascertained that no radio interference occurs in relation to the neighboring base stations. The base station apparatus 21 is thus set in operation to communicate with other mobile stations by transmitting the radio of that frequency (step S3).

The base station apparatus 21 informs the monitor-&-control station 15 via the relay channel apparatus 22, the satellite relay channel, and the satellite base station 14 that communication by use of the radio of that frequency is now possible (step S4). In this manner, the monitor-&-control station 15 learns the operative state of the mobile base station 20, and identifies the frequency to be used, followed by engaging in the operation to monitor the mobile base station 20. Thereafter, the base station apparatus 21 is operated by using the radio wave of the above-noted frequency in the mobile communication system.

If the radio waves found by the search include the same frequency that the base station apparatus 21 is supposed to use for its own communication (YES at step S2), it is ascertained that radio interference occurs in relation to the neighboring base stations. In this case, the base station apparatus 21 switches the frequency of radio waves used for its own communication to one of the frequencies that were identified in advance as usable in the mobile communication system (step S5). Then, the radio search receiver 23 searches for radio waves received from the neighboring base stations (step S6). The base station apparatus 21 checks whether the radio waves found in this manner include the same frequency that is selected by the switching of frequencies described above (step S7).

If the frequency selected by the switching of frequencies is included in the radio waves found by the search, the base station apparatus 21 switches frequencies successively, and repeat checking whether the radio waves found by the search include the same frequency that is selected by the switching of frequencies. If the frequency selected by the switching of frequencies is not included in the radio waves found by the search (NO at step S7), it is ascertained that no radio interference occurs in relation with the neighboring base stations. In this case, the base station apparatus 21 starts the operation thereof by transmitting the radio wave of the frequency obtained by the switching of frequencies (step S3). Further, the base station apparatus 21 informs the monitor-&-control station 15 of the start of operation using the frequencies obtained by the switching of frequencies (step S4).

If all the frequencies usable in the mobile communication system are included in the radio waves found by the search (YES at step S7), the base station apparatus 21 engages in the state of suspended radio transmission, and informs the monitor-&-control station 15 via the relay channel apparatus 22, the satellite relay channel, and the satellite base station 14 that the operation thereof is brought into a standby state (step S8). In this manner, the monitor-&-control station 15 learns a shift to the standby state of the mobile base station 20, and removes the mobile base station 20 from the lists of mobile base stations that need to be monitored.

Each time the mobile base station 20 moves to a new position, the procedures as described above is performed. Accordingly, the procedure corresponding to steps S1 through S4 is repeatedly performed when the mobile base station 20 is moving outside the communication area covered by the fixed base stations (e.g., the base station 10) of the mobile communication system, resulting in the mobile base station 20 being set in the operative state. When the mobile base station 20 enters the communication area covered by the fixed base stations of the mobile communication system, the procedure corresponding to steps S1 through S7 is performed, so that the frequency to be used is successively switched. If the switched frequency differs from any frequency of the radio waves found by the search, this frequency is used in operation (from step S7 to steps S3 and S4). If all the frequencies switched one after another match those of the radio waves found by the search, the mobile base station 20 is brought into the standby state.

With the control of the mobile base station 20 as described above, the radio waves transmitted from the neighboring base stations are actually searched for, and the frequencies of the radio waves found by the search are compared with the frequency to be used by the mobile base station so as to identify the condition of radio interference, thereby controlling the mobile base station 20 based on the identified condition (by switching between a standby state, a continued operation, and an operation after changing operation conditions). Accordingly, a properly controlled operation is achieved for the mobile base station 20 in real-time even when the mobile base station 20 moves to a new position.

In the above example, a description has been given with reference to a case in which the mobile base station 20 is linked to a single mobile communication system. Notwithstanding, the mobile base station 20 may be linked to a plurality of mobile communication systems operated by respective communication providers. In such a case, the same procedure as described above can be performed with respect to each of the mobile communication systems to which the mobile base station 20 is to be installed, thereby achieving proper operation control of the mobile base station 20.

Figure 3:
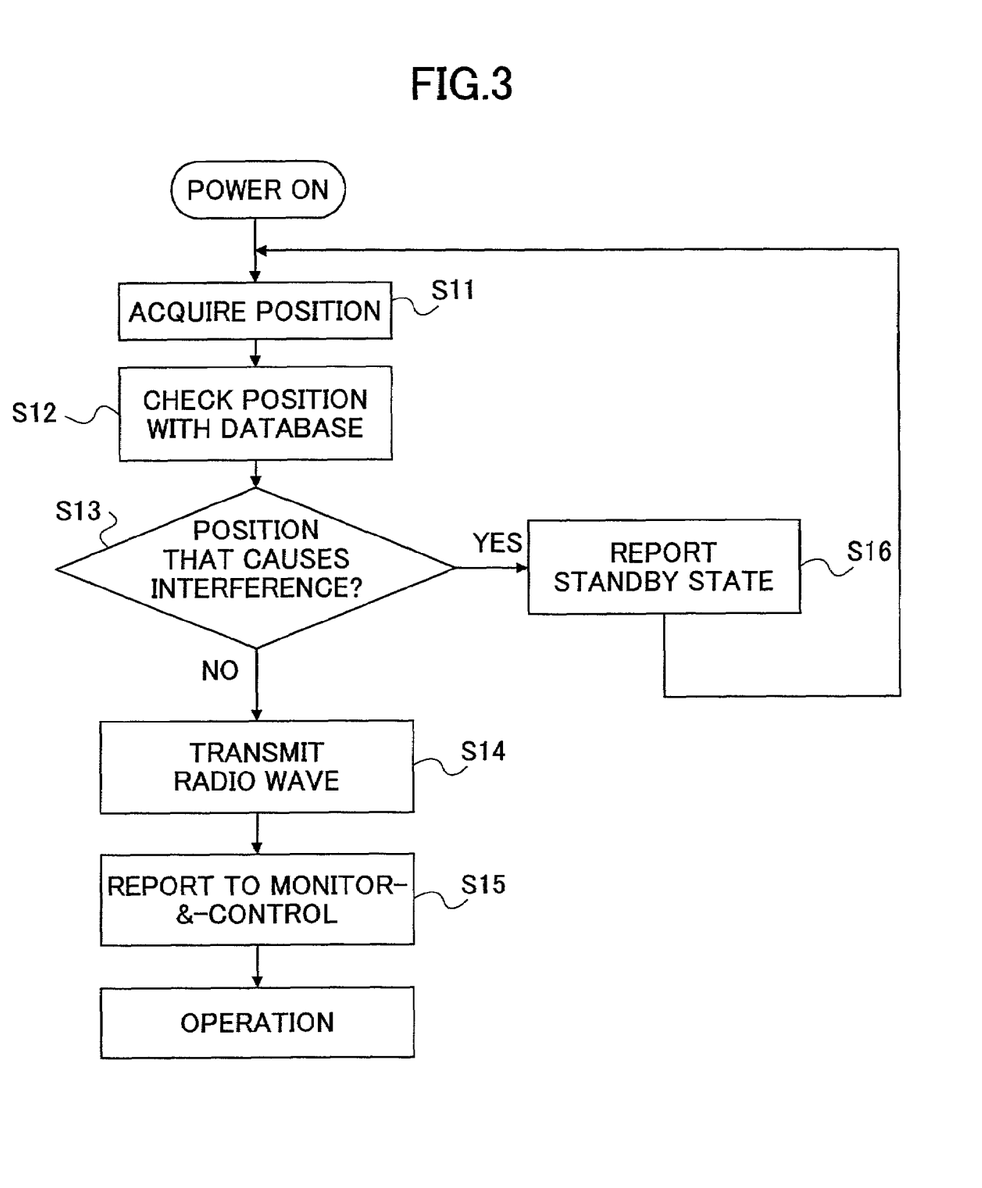
FIG. 3 is a flowchart showing another procedure by which the mobile base station is controlled as to the operation thereof.

FIG. 3 is a flowchart showing another procedure by which the mobile base station 20 may be controlled as to the operation thereof. In this example, the condition of radio interference is estimated based on the relative positional relationship between the mobile base station 20 and neighboring base stations.

In FIG. 3, the GPS apparatus 24 measures the position of the mobile base station 20 upon the power on (step S11). The information about the position obtained in this manner is supplied to the base station apparatus 21. The base station apparatus 21 refers to a database that includes the positions of fixed base stations of the mobile communication system (and the positions of other mobile base stations if necessary), and compares its own position with the positions of the base stations included in the database (step S12). The database may be provided in the mobile base station 20. Alternatively, the database may be provided in other facility of the mobile communication system such as the address input circuit 13, and is obtained by the mobile base station 20 via the satellite base station 14 and the satellite relay channel. It is desirable, however, that the database is easily updated to reflect changes when changes are made to the arrangement of the base stations in the mobile communication system, and the positions of other mobile base stations can be easily registered in the database. To this end, the database is preferably provided in some facility of the mobile communication system (e.g., the monitor-&-control station 15), and is supplied to the mobile base station 20 each time the use thereof becomes necessary.

The base station apparatus 21 checks, based on the relative positional relationship between itself and the other base stations obtained as a result of the comparison, whether its own position is expected to create radio interference with the other base stations (step S13). For example, the conditions that are expected to cause radio interference according to the analysis of radio transmission characteristics may be defined in advance in terms of a relative positional relationship (i.e., distances and directions) between the mobile base station and the other base stations. The check at step S13 is made by deciding whether these conditions are satisfied by the relative positional relationship between the actually measured position of the mobile base station and the database-registered positions of the other base stations.

If the check finds that the position of the mobile base station does not cause radio interference (NO at step S13), the base station apparatus 21 transmits radio waves (step S14), and the mobile base station 20 is set in operation, followed by the base station apparatus 21 reporting to the monitor-&-control station 15 via the satellite relay channel that the mobile base station 20 is now in operation (step S15). If the monitor-&-control station 15 is in the possession of the database regarding the positions of base stations, for example, the reporting to the monitor-&-control station 15 as described above is accompanied by the information about the position of the mobile base station 20.

If the check finds that the position of the mobile base station causes radio interference (YES at step S13), the base station apparatus 21 engages in the state of suspended radio transmission, and informs the monitor-&-control station 15 via the satellite relay channel that the operation thereof is brought into a standby state.

According to the operation control described above, the condition of radio interference is estimated based on the relative relationship between the position of the mobile base station 20 and the positions of the other base stations where such a relative positional relationship is relatively easy to obtain. The required processing is thus relatively easy to perform in this case.

Figure 4:
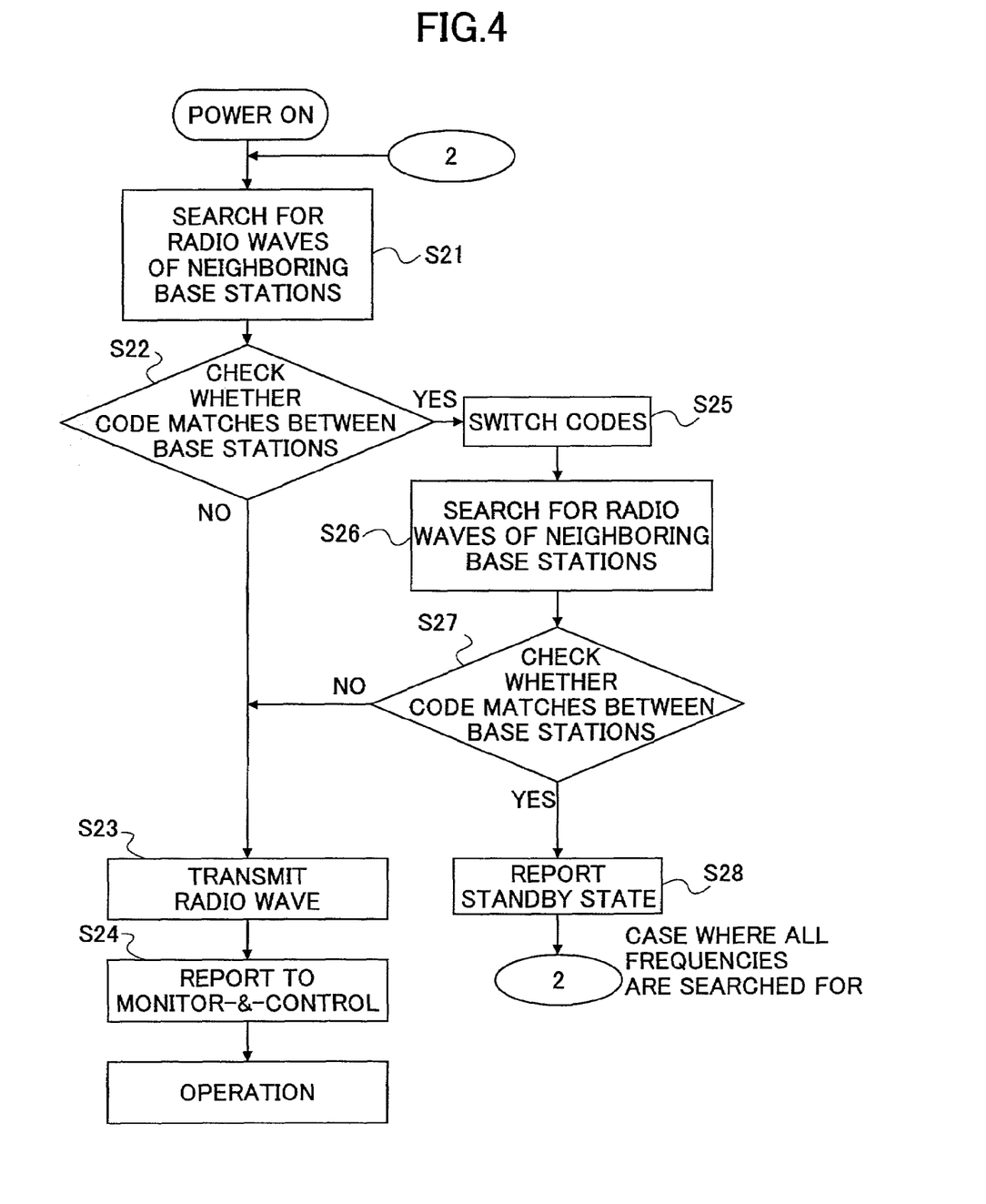
FIG. 4 is a flowchart showing another procedure by which the operation of the mobile base station is controlled.

FIG. 4 is a flowchart showing another procedure by which the operation of the mobile base station 20 may be controlled. In this example, the mobile base station 20 is linked to a CDMA mobile communication system.

In FIG. 4, when power is switched on, the radio search receiver 23 searches for radio waves received from neighboring base stations (step S21). Received signals corresponding to the received radio waves are supplied to the base station apparatus 21. The base station apparatus 21 decodes the received signals, and obtains codes unique to respective base stations. The base station apparatus 21 then checks whether the radio signals include the same code that the base station apparatus 21 is supposed to use for its own communication (step S22). If the radio waves found by the search do not include the same code that the base station apparatus 21 is supposed to use for its own communication (NO at step S22), it is ascertained that no radio interference occurs in relation to the neighboring base stations. The base station apparatus 21 is thus set in operation to communicate with neighboring mobile stations by transmitting the radio of a predetermined frequency based on the use of the code (step S23).

The base station apparatus 21 informs the monitor-&-control station 15 via the satellite relay channel that the operation based on the use of the code is now possible (step S24), in the same manner as in the previous example (FIG. 2). In this manner, the monitor-&-control station 15 learns the operative state of the mobile base station 20, and identifies the code to be used, followed by engaging in the operation to monitor the mobile base station 20. Thereafter, the base station apparatus 21 is operated by using the above-noted code in the mobile communication system.

If the radio waves found by the search include the same code that the base station apparatus 21 is supposed to use for its own communication (YES at step S22), it is ascertained that radio interference occurs in relation to the neighboring base stations. In this case, the base station apparatus 21 switches the code used for its own communication to one of the codes that were identified in advance as usable in the CDMA mobile communication system (step S25). Then, the radio search receiver 23 searches for radio waves received from the neighboring base stations (step S26). The base station apparatus 21 checks whether the radio waves found by the search include the same code that is selected by the switching of codes described above (step S7).

If the code selected by the switching of codes is included in the radio waves found by the search, the base station apparatus 21 switches codes successively, and repeats checking whether the radio waves found by the search include the same code that is selected by the switching of codes. If the code selected by the switching of codes is not included in the radio waves found by the search (NO at step S27), it is ascertained that no radio interference occurs in relation with the neighboring base stations. In this case, the base station apparatus 21 starts the operation thereof by transmitting a radio wave using the code obtained by the switching of codes (step S23). Further, the base station apparatus 21 informs the monitor-&-control station 15 of the start of operation using the code obtained by the switching of codes (step S24).

If all the codes usable in the mobile communication system are included in the radio waves found by the search (YES at step S27), the base station apparatus 21 engages in the state of suspended radio transmission, and informs the monitor-&-control station 15 via the satellite relay channel that the operation thereof is brought into a standby state (step S28). In this manner, the monitor-&-control station 15 learns a shift to the standby state of the mobile base station 20, and removes the mobile base station 20 from the lists of mobile base stations that need to be monitored.

With the control of the mobile base station 20 as described above, the radio waves transmitted from the neighboring base stations are actually searched for, and the codes of the radio waves found by the search are compared with the code to be used by the mobile base station so as to identify the condition of radio interference, thereby controlling the mobile base station 20 based on the identified condition (by switching between a standby state, a continued operation, and an operation after changing operation conditions). Accordingly, a properly controlled operation is achieved for the mobile base station 20 in real-time even when the mobile base station 20 moves to a new position.

Figure 5:
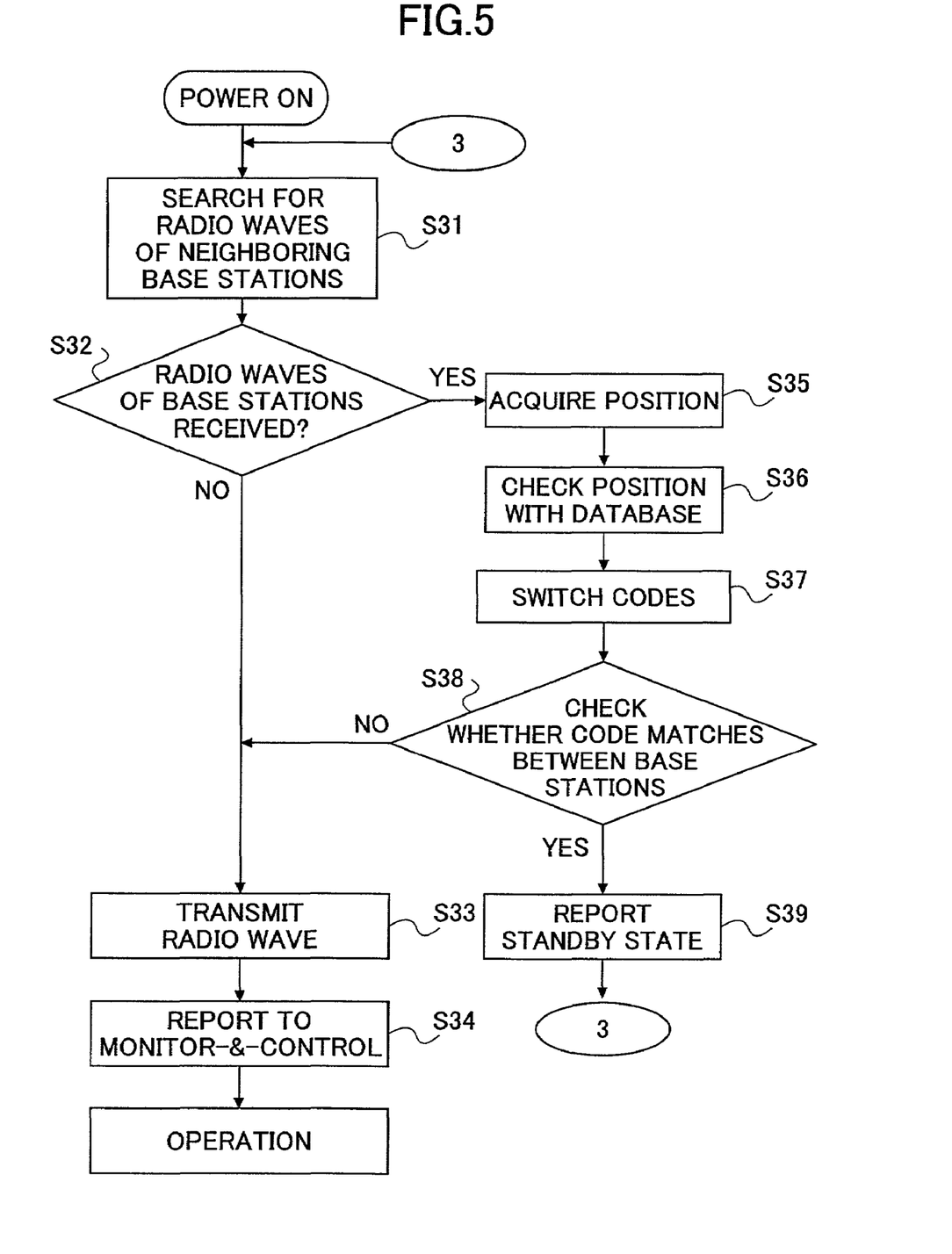
FIG. 5 is a flowchart showing another procedure by which the operation of the mobile base station is controlled.

FIG. 5 is a flowchart showing another procedure by which the operation of the mobile base station 20 may be controlled. In this example, frequencies of radio waves transmitted from neighboring base stations and codes included therein are taken into consideration to estimate the condition of radio interference.

In FIG. 5, upon the power-on operation, radio waves received from neighboring base stations are searched for (step S31). A check is then made as to whether the radio signals found by the search include a radio wave of the same frequency that the base station apparatus 21 is supposed to use (step S32). If the radio waves found by the search do not include the radio wave of the same frequency that the base station apparatus 21 is supposed to use (NO at step S32), the base station apparatus 21 starts communication by using a predetermined code based on the use of this radio wave (step S23). The fact that the mobile base station 20 is now in operation is reported from the base station apparatus 21 to the monitor-&-control station 15 via the satellite relay channel (step S34).

If the radio waves found by the search include the radio wave of the same frequency that the base station apparatus 21 is supposed to use (YES at step S32), the GPS apparatus 24 measures the position of the mobile base station 20 (step S35). The information about the position obtained in this manner is supplied to the base station apparatus 21. The base station apparatus 21 refers to a database that includes the positions and assigned codes of fixed base stations of the mobile communication system (and the positions and employed codes of other mobile base stations if necessary), and compares its own position and code with the positions and codes of the base stations included in the database (step S36). Based on the findings of the comparison, the base station apparatus 21 makes a code setting by using a code other than the codes assigned to the other base stations that are positioned within a predetermined proximity of its own position (step S37).

The base station apparatus 21 further checks whether the base-station-specific codes obtained by decoding the signals of the radio waves found by the search include the code of the above code setting (step S38). If the radio waves found by the search include the code of the code setting, it is estimated that radio interference occurs in relation to base stations that are positioned relatively far away from the mobile base station 20. The base station apparatus 21 thus switches the code to another code selected from the codes identified in advance as usable in the mobile communication system (step S38). If the code selected by the switching of codes is included in the radio waves found by the search, the base station apparatus 21 switches codes successively, and repeats checking whether the radio waves found by the search include the same code that is selected by the switching of codes. If the code selected by the switching of codes is not included in the radio waves found by the search (NO at step S38), the base station apparatus 21 starts the operation thereof by transmitting a radio wave using the code obtained by the switching of codes (step S33). Further, the base station apparatus 21 informs the monitor-&-control station 15 of the start of operation using the code obtained by the switching of codes (step S34).

If all the codes usable in the mobile communication system are included in the radio waves found by the search (YES at step S38), the base station apparatus 21 engages in the state of suspended radio transmission, and informs the monitor-&-control station 15 via the satellite relay channel that the operation thereof is brought into a standby state (step S39).

With the control of the mobile base station 20 as described above, the radio frequencies and codes used by the base stations surrounding the mobile base station 20 are compared with the radio frequency and the code to be used by its own station so as to identify the condition of radio interference, thereby controlling the mobile base station 20 based on the identified condition (by switching between a standby state, a continued operation, and an operation after changing operation conditions). Accordingly, a properly controlled operation is achieved for the mobile base station 20 in real-time even when the mobile base station 20 moves to a new position.

The operation control of the mobile base station 20 according to the various embodiments described above changes radio frequencies and codes to be used based on an estimate of radio interference with neighboring base stations, thereby controlling operation conditions. Notwithstanding these examples, the operation conditions may be controlled by modifying the transmission power of radio waves or the directionality of radio waves. Alternatively, more than one factor may be concurrently modified such as the directionality being changed concurrently with the transmission power, the frequency being changed simultaneously with the directionality, etc.

Further, information used for estimating the condition of radio interference between the mobile base station 20 and the neighboring base stations includes the position of the mobile base station 20, the frequencies of radio waves received from the neighboring base stations, and the codes included in these radio waves according to the embodiments described above. Notwithstanding these embodiments, the present invention is not limited to the use of any particular type of information for the estimation purpose.

For example, when the radio search receiver 23 receives radio waves from each mobile station 40 residing around the mobile base station 20, the condition of the received radio waves (e.g., the condition of reception levels) may indicate whether each mobile station 40 is communicating with base stations relatively close to the mobile base station 20. In such a case, the condition of radio waves from each mobile station 40 (e.g., the condition of reception levels) can be used as estimation-purpose base information. Namely, it is estimated that radio interference with a given base station occurs if the reception level of a radio wave received from each mobile station 40 indicates a presence of this given base station in a close proximity of the mobile base station 20.

Further, when the base station apparatus 21 receives radio waves from the mobile station 40 residing within the area of its communication coverage, it is possible to identify a base station with which the mobile station 40 is communicating, based on the information obtained by decoding the received radio waves. In this case, the condition of radio interference with this base station can be estimated based on the position of the base station or the like.

When the base station apparatus 21 communicates with the mobile station 40 residing within its area of communication, the condition of radio interference with neighboring base stations can be estimated based on the degradation of communication quality. In this case, it is possible to estimate the condition of radio interference with high accuracy by using statistical data regarding the communication quality observed when the mobile base station 20 is communicating while on the move.

Further, the above embodiments have been described with reference to a case in which the mobile base station 20 estimates the condition of radio interference based on the estimate-purpose base information such as frequencies, codes, and positions, and information to be used for operation control (inclusive of operation conditions such as a frequency and a code as well as a check determination regarding whether to engage in operation) is obtained based on the estimates. The mobile base station 20 then controls the operation thereof based on the information for operation control.

The present invention is not limited to these particular examples. For example, the estimate-purpose base information (frequencies, codes, and positions) obtained by the mobile base station 20 may be transferred to the monitor controlling station 15 via the satellite relay channel, and the monitor controlling station 15 may generate the information to be used for operation control that includes operation conditions such as a frequency and a code as well as a check determination regarding whether to engage in operation. The information to be used for operation control generated in this manner may then be supplied to the mobile base station 20 (i.e., the base station apparatus 21) via the satellite relay channel, so that the mobile base station 20 (i.e., the base station apparatus 21) can be operated according to the supplied operation control information.

In such a configuration, the monitor controlling station 15 performs steps S2, S5, S6, and S7 of FIG. 2. When the monitor controlling station 15 obtains an estimate as a result of the check at step S2 or S7 that no radio interference occurs, the operative state thereof and the operation condition (frequency) are reported to the base station apparatus 21. The base station apparatus 21 is then operated according to the reported operation condition. When an estimate indicative of radio interference is obtained as a result of the check at step S7, the monitor controlling station 15 sends to the base station apparatus 21 the operation control information that indicates a standby state. Based on the operation control information, the base station apparatus 21 engages in the standby state.

In the same manner as in FIG. 2, steps S12 and S13 of FIG. 3, steps S22, S25, and S27 of FIG. 4, steps S32, S35, S36, S37, and S38 of FIG. 5 may be carried out by the monitor controlling station 15.

In the above embodiments, the mobile base station 20 communicates with the satellite base station 14 of the mobile communication system via the satellite relay channel. The present invention is not limited to this particular configuration. The mobile base station 20 may be linked to the mobile communication system via a terrestrial microwave channel or a wireless channel of another mobile communication system, for example.

Figure 6:
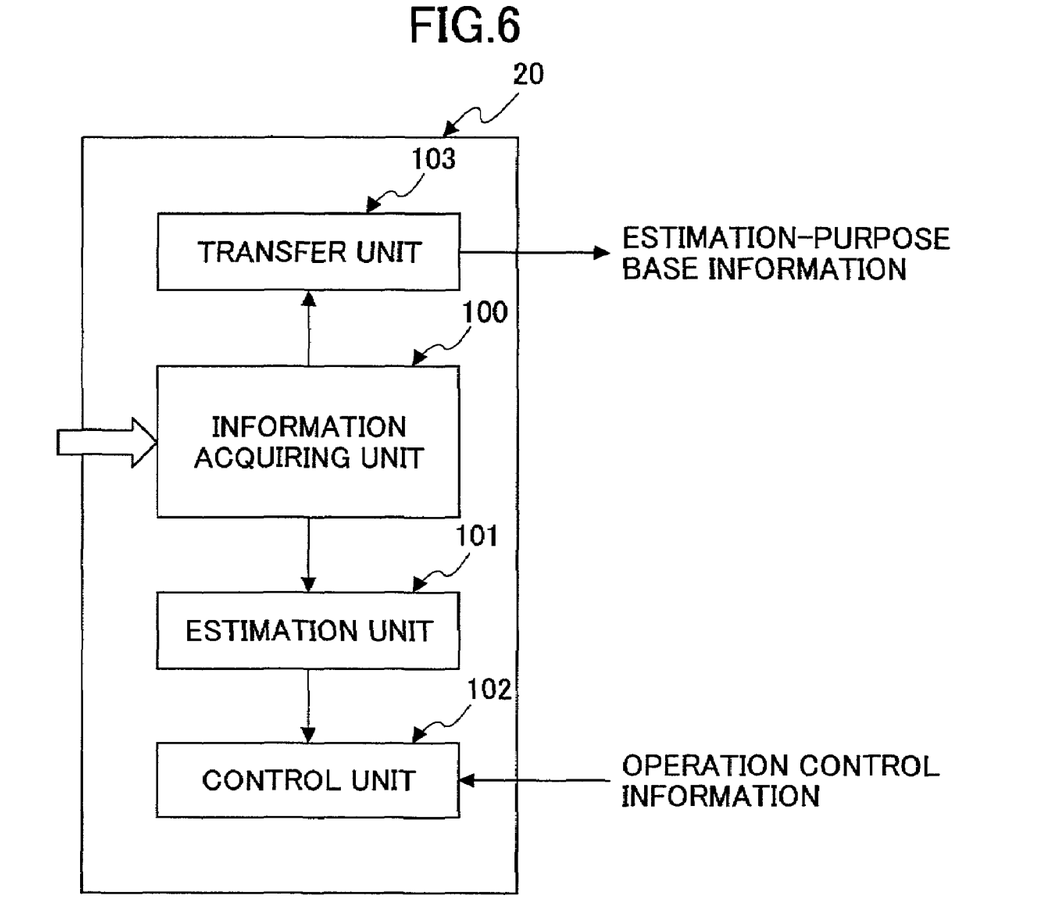
FIG. 6 is a block diagram showing a functional configuration of the mobile base station according to the present invention.

FIG. 6 is a block diagram showing a functional configuration of the mobile base station 20 according to the present invention.

The mobile base station 20 of FIG. 6 includes an information acquiring unit 100, an estimation unit 101, a control unit 102, and a transfer unit 103. The information acquiring unit 100 acquires estimation-purpose base information that is to be used for estimating the condition of radio interference where the information is responsive to the position of the mobile base station 20. The information acquiring unit 100 corresponds to the radio search receiver 23 and to the GPS apparatus 24 of the embodiments previously described. In the case of the radio search receiver 23, the estimation-purpose base information relates to radio waves received from neighboring base stations. These radio waves will change as the mobile base station 20 moves its position and have a different set of base stations in its neighbor. In the case of the GPS apparatus 24, the estimation-purpose base information is the position of the mobile base station 20.

The estimation unit 101 estimates the condition of radio interference based on the estimation-purpose base information. The control unit 102 controls the operation of the mobile base station 20 based on the estimated condition of radio interference. The estimation unit 101 and the control unit 102 may correspond to the base station apparatus 21 in the configuration of FIG. 1.

When the estimation function is provided not in the mobile base station 20 but in the monitor controlling station 15, the transfer unit 103 transfers the estimation-purpose base information to the monitor controlling station 15 via the satellite relay channel. In response, the monitor controlling station 15 generates the information to be used for operation control. The operation control information is then supplied from the monitor controlling station 15 to the control unit 102. The control unit 102 controls the operation of the mobile base station 20 according to the supplied operation control information.

Further, the present invention is not limited to these embodiments, but various variations and modifications may be made without departing from the scope of the present invention.

The present application is based on Japanese priority application No. 2001-199089 filed on Jun. 29, 2001, with the Japanese Patent Office, the entire contents of which are hereby incorporated by reference.

What is claimed is:

1. A method of controlling an operation of a mobile base station that is linked to a mobile communication system via a wireless relay channel, comprising:
   an information acquiring step of acquiring estimation-purpose base information for estimating a condition of radio interference between said mobile base station and one or more other base stations, the acquisition of said estimation-purpose base information being made by said mobile base station and involving measurement of a physical property responsive to a current position of said mobile base station;
   an estimation step of estimating the condition of radio interference based on the acquired estimation-purpose base information; and
   a control step of controlling an operation of the mobile base station based on the estimated condition of radio interference, wherein
   said information acquiring step measures the position of the mobile base station as said estimation-purpose base information, and said estimation step estimates the condition of radio interference by assessing a relative positional relationship between the measured position of the mobile base station and positions of the one or more other mobile stations.

2. The method as claimed in claim 1, wherein said control step makes the mobile base station stay in a standby state in response to the estimated condition of radio interference that indicates presence of radio interference.

3. The method as claimed in claim 1, further comprising a switching step of switching operation conditions of the mobile base station, wherein said control step controls the operation of the mobile base station according to an operation condition obtained by said switching step if said switching step obtains the operation condition that insures absence of radio interference.

4. The method as claimed in claim 1, wherein said estimation step is performed by said mobile base station.

5. The method as claimed in claim 1, wherein said estimation step is performed by a facility of the mobile communication system based on the estimation-purpose base information supplied from the mobile base station to said facility via a wireless relay channel.

6. The method as claimed in claim 5, wherein said control step makes said facility generate operation control information based on the estimated condition of radio interference estimated by said facility, and controls the operation of the mobile base station based on the operation control information transferred from said facility to the mobile base station via the wireless relay channel.

7. The method as claimed in claim 1, wherein the wireless relay channel includes a satellite relay channel.

8. A mobile base station to be linked to a mobile communication system via a wireless relay channel, comprising:
   an information acquiring unit which acquires estimation-purpose base information for estimating a condition of radio interference between said mobile base station and one or more other base stations, the acquisition of said estimation-purpose base information involving measurements of a physical property responsive to a current position of said mobile base station;
   an estimation unit which estimates the condition of radio interference based on the acquired estimation-purpose base information; and
   a control unit which controls an operation of the mobile base station based on the estimated condition of radio interference; wherein
   said information acquiring unit measures the position of the mobile base station as said estimation-purpose base information, and said estimation unit estimates the condition of radio interference by assessing a relative positional relationship between the measured position of the mobile base station and positions of the one or more other mobile stations.

9. The mobile base station as claimed in claim 8 wherein said control unit makes the mobile base station stay in a standby state in response to the estimated condition of radio interference that indicates presence of radio interference.

10. The mobile base station as claimed in claim 9, wherein said estimation unit switches operation conditions of the mobile base station, wherein said control unit controls the operation of the mobile base station according to an operation condition obtained by said estimation unit if said estimation unit obtains the operation condition that insures absence of radio interference.

11. The mobile base station as claimed in claim 8, wherein the wireless relay channel includes a satellite relay channel.

* * * * *